No. 786,790.     Patented April 4, 1905.

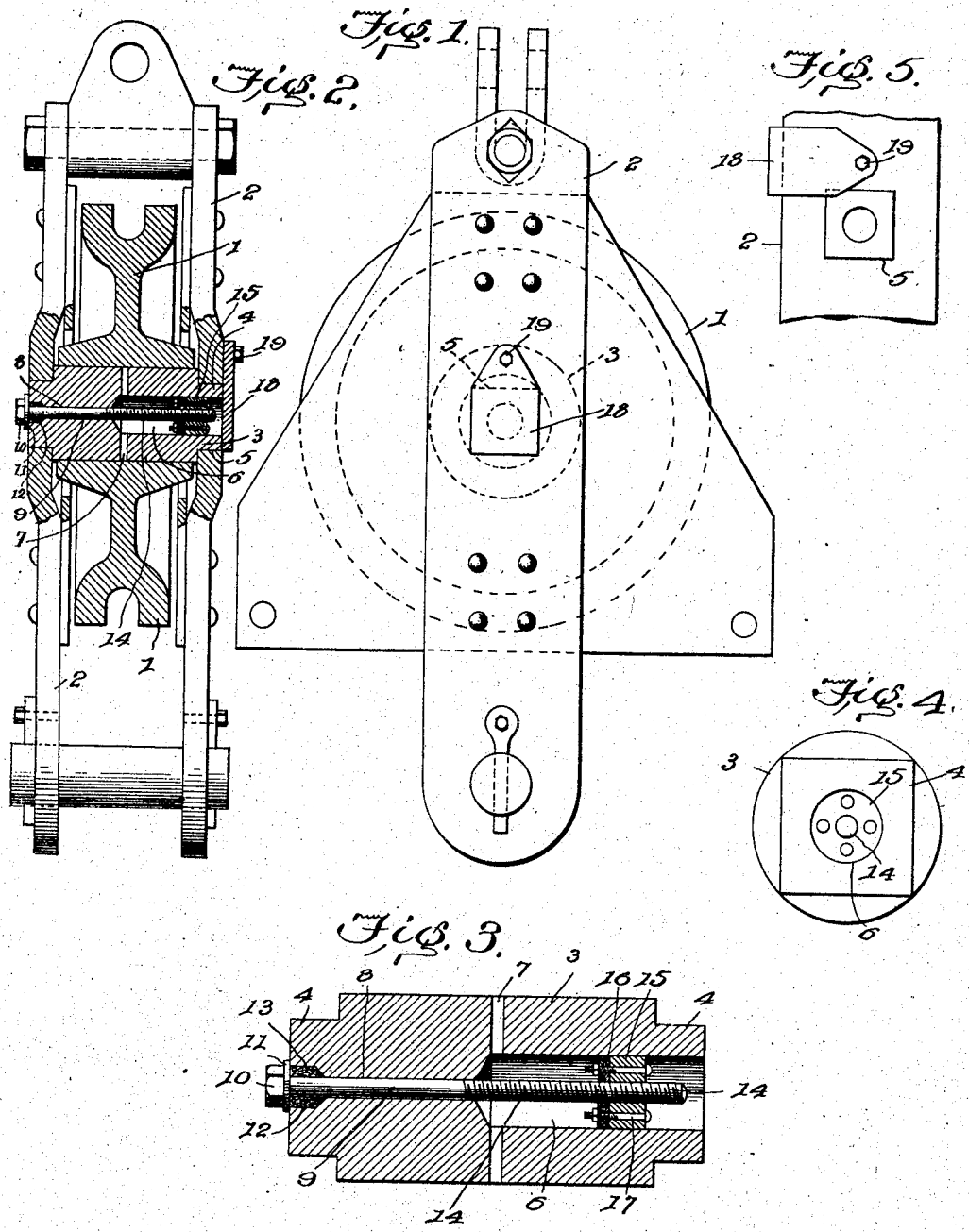

UNITED STATES PATENT OFFICE.

GEORGE W. KING, HARRY J. BARNHART, AND CHARLES B. KING, OF MARION, OHIO, ASSIGNORS TO THE MARION STEAM SHOVEL COMPANY, OF MARION, OHIO, A CORPORATION OF OHIO.

LUBRICATED PULLEY.

SPECIFICATION forming part of Letters Patent No. 786,790, dated April 4, 1905.

Original application filed September 29, 1902, Serial No. 125,241. Divided and this application filed January 28, 1904. Serial No. 191,016.

*To all whom it may concern:*

Be it known that we, GEORGE W. KING, HARRY J. BARNHART, and CHARLES B. KING, citizens of the United States, residing at Marion, in the county of Marion and State of Ohio, have invented certain new and useful Improvements in Lubricated Pulleys and the Like, of which the following is a specification, reference being had therein to the accompanying drawings.

This invention relates to lubricated pulleys and the like, and has for its object to provide a construction whereby a pulley or other wheel rotating around a non-rotating shaft or pin may be readily lubricated, the supply of lubricant being contained in the bearing pin or shaft and being fed therefrom to the bearing-surfaces as it may be required.

To these and other ends our invention consists in certain novel features, which we will now proceed to describe and will then particularly point out in the claims.

In the accompanying drawings, Figure 1 is a side elevation of a structure embodying our invention in one form. Fig. 2 is an end elevation, partly in central vertical section. Fig. 3 is an enlarged view of a part of Fig. 2. Fig. 4 is a view of one end of the bearing-pin; and Fig. 5 is a view of a portion of Fig. 1, showing the cover-plate swung up out of the way to expose the end of the bearing-pin and the opening in the frame or support in which it fits.

Referring to the accompanying drawings, we have therein shown our invention as applied to a sheave-block, although it is obviously capable of other applications.

In said drawings, 1 indicates the sheave or pulley-wheel, and 2 the frame or support in which it is mounted, this latter comprising in the present instance two vertical side bars suitably united at top and bottom. The wheel 1 is mounted on a bearing-pin 3, having a cylindrical body portion on which the wheel fits and rotates, the ends of said bearing-pin passing through the sides of the supporting-frame 2 and being mounted therein in any suitable manner which will prevent the pin from rotating. We prefer for this purpose the construction shown, in which the pin is provided at each end with an extension 4, square in cross-section and fitting a similarly-shaped aperture 5 in the corresponding frame side.

In order to properly lubricate the bearing-surfaces between the wheel 1 and the body of the pin 2, we form within the pin a lubricant-chamber 6, preferably cylindrical in form and extending from one end of the pin inward to a point about midway of the length of the pin or slightly more. From the inner end of this chamber passages 7 extend outward to the bearing-surfaces of the body of the pin, at about the center thereof. From the inner end of the chamber 6 an aperture 8 extends longitudinally through the body of the pin to the farther end thereof, and a rod 9 fits and turns freely in this aperture, through which it extends and beyond which it projects at one end beyond the end of the pin 3 and at the other end into and substantially through the chamber 6, along the center of which it lies. The exposed end of this rod is provided with a head 10, adapted to receive a wrench, or is otherwise so constructed as to permit it to be readily turned and to limit the longitudinal movement of the rod in the direction of the chamber 6. Between this head and the end of the pin 3 there is interposed a washer 11, and immediately adjacent thereto the pin is provided with a recess 12, in which is located a suitable packing 13. That portion of the rod 9 which extends into the chamber 6 is threaded, as indicated at 14, and passes through a correspondingly-threaded aperture in a piston 15, fitting within the chamber 6 and movable longitudinally therein. At its inner end this piston is provided with a suitable packing 16, preferably in the form of a ring of leather or the like, which fits against the wall of the chamber 6 and prevents the lubricant from escaping past the piston. This packing is secured in position by means of bolts 17, which pass longitudinally through the piston, their heads or nuts projecting into the interior of the chamber 6.

In order to prevent the entrance of dust or dirt or other detrimental substances into the lubricant-chamber, we provide a closure, preferably in the form of a cover-plate 18, mounted on the exterior of the frame side in a position to adapt it to cover the open mouth of the chamber 6, it being suspended from a pivot-screw 19, located above the opening 5, so that it will normally swing by gravity into the closed position shown in Fig. 1, although it may be readily swung up into the position shown in Fig. 5 when it is desired to have access to the lubricant-chamber.

Our structure is devised for use in connection with a lubricant in the form of a grease, and in practice this lubricant is placed within the chamber 6 between the inner end of said chamber and the inner face of the piston. The piston may be readily removed to permit the grease to be inserted and may be as readily replaced and connected with the operating-rod 9. When it is desired to supply the lubricant to the bearing-surfaces between the pin and wheel, the rod 9 is rotated by means of the provision on its exposed end for that purpose. The bolts which secure the packing to the piston project therefrom into the chamber a distance sufficient to cause them to engage the relatively stiff lubricant in said chamber, and thus prevent the piston from rotating. Rotation of the rod 9 in the proper direction therefore draws the piston 15 toward the inner end of the chamber 6, and thereby forces the lubricant out through the passages 7 to the bearing-surfaces. The packing 16 prevents the lubricant from escaping past the piston 15, while the packing 13 prevents the lubricant from escaping at the other end of the pin 3. This operation may be repeated as often as lubrication of the bearing-surfaces is required, all that is necessary being the application of a wrench to the exposed head 10 of the rod 9 and the turning of the rod to an extent sufficient to supply the necessary amount of lubricant, and this operation may be performed again and again until the supply of lubricant in the chamber 6 is exhausted, whereupon the supply may be readily renewed.

The structure is simple, inexpensive, and self-contained, adding nothing to the bulk or dimensions of the parts excepting the projection of the operating-rod. By relying upon projections from the inner face of the piston to engage the grease and prevent rotation of the piston we are enabled to employ a lubricant-chamber which is cylindrical in form or truly circular in cross-section. This facilitates the forming of said chamber in the pin and also gives to the chamber a form which permits it to be readily and effectually packed in such a way as to prevent the grease from escaping past the piston when under pressure.

The present application is a division of an application filed by us September 29, 1902, Serial No. 125,241.

Having thus fully described our invention, what we claim as new, and desire to secure by Letters Patent, is—

1. In a lubricated bearing of the character described, a non-rotating bearing-pin having a lubricant-chamber extending from one end of the pin partly through said pin, and having an outwardly-extending lubricant-passage from its closed inner end to the bearing-surface of the pin, a rotatable rod mounted in the closed end of the pin, extending centrally along the chamber and having a threaded engagement with the piston, means for preventing longitudinal motion of the rod, and means for preventing rotary motion of the piston, whereby rotation of the rod draws the piston toward the closed end of the lubricant-chamber, substantially as described.

2. The combination, with a wheel and a non-rotating bearing pin or axle provided with a lubricating-chamber open at one end of the pin and extending thence inward and closed at its other end, said pin having a lubricant-passage extending outward from the closed end of the chamber to the bearing-surface of the pin, of a non-rotating piston fitting said lubricant-chamber, and a rod rotatably mounted in the closed end of the pin, one end of said rod extending into the chamber centrally thereof and having a threaded engagement with the piston, the other end of the rod being exposed and provided with a head to limit the inward motion of the rod and permit its rotation, substantially as described.

3. In a lubricated bearing of the character described, a non-rotating bearing-pin provided with a longitudinally-extending cylindrical lubricant-chamber circular in cross-section, a piston fitting said chamber, provided with a central threaded aperture, and having projections extending into the chamber to engage the lubricant, and a rod rotatably mounted in the pin, and extending centrally along the chamber and threaded to engage the piston, said rod being provided with means for preventing longitudinal motion of the rod toward the piston, substantially as described.

4. In a lubricated bearing of the character described, a non-rotating bearing-pin provided with a longitudinally-extending cylindrical lubricant-chamber circular in cross-section, a piston fitting said chamber, provided with a central threaded aperture, and having projections extending into the chamber to engage the lubricant, a rod rotatably mounted in the pin and threaded to engage the piston, and means for preventing longitudinal motion of the rod toward the piston, said piston being provided with a packing-ring at its inner end, and with longitudinal bolts securing said packing-ring to the piston, said bolts constituting the lubricant-engaging projections, substantially as described.

5. In a lubricated bearing of the character described, a bearing-pin having an axial lubricant-chamber open at one end of the pin and closed at the other end, said chamber being circular in cross-section and said pin having a lubricant-passage extending from the closed end of the chamber to the bearing-surface of the pin, a piston fitting said chamber and having a packing secured thereon by inwardly-projecting bolts, and a rod rotatably mounted in the other end of the pin, provided with a head and packing at its outer end, and having its other end threaded to engage the piston, substantially as described.

In testimony whereof we affix our signatures in presence of two witnesses.

GEORGE W. KING.
HARRY J. BARNHART.
CHARLES B. KING.

Witnesses:
ROBERT G. LUCAS,
WILLIAM R. SHISLER